(12) United States Patent
Lummer et al.

(10) Patent No.: US 10,837,310 B2
(45) Date of Patent: Nov. 17, 2020

(54) VARIABLE TURBINE OR COMPRESSOR GEOMETRY FOR AN EXHAUST GAS TURBOCHARGER

(71) Applicant: Bosch Mahle Turbo Systems GmbH & Co. KG, Stuttgart (DE)

(72) Inventors: Dirk Lummer, Ludwigsburg (DE); Dirk Naunheim, Stuttgart (DE)

(73) Assignee: BMTS Technology GmbH & Co. KG (DE)

( * ) Notice: Subject to any disclaimer, the term of this patent is extended or adjusted under 35 U.S.C. 154(b) by 668 days.

(21) Appl. No.: 15/211,903

(22) Filed: Jul. 15, 2016

(65) Prior Publication Data
US 2017/0016343 A1    Jan. 19, 2017

(30) Foreign Application Priority Data

Jul. 16, 2015 (DE) .................. 10 2015 213 321

(51) Int. Cl.
*F01D 17/16* (2006.01)
*F01D 25/16* (2006.01)
(Continued)

(52) U.S. Cl.
CPC .......... *F01D 17/165* (2013.01); *F01D 25/16* (2013.01); *F02B 33/40* (2013.01); *F02B 37/24* (2013.01);
(Continued)

(58) Field of Classification Search
CPC ...... F01D 17/165; F01D 25/16; F04D 29/462; F02B 33/40; F02B 37/24; Y02T 10/144;
(Continued)

(56) References Cited

U.S. PATENT DOCUMENTS 6,409,483 B2 *  6/2002  Jinnai ................... F01D 17/165
                                                            415/150
7,850,421 B2   12/2010  Battig et al.
(Continued)

FOREIGN PATENT DOCUMENTS

CN         101072925       8/2012
DE         10262006 B4     9/2005
(Continued)

OTHER PUBLICATIONS

European Search Report dated Nov. 3, 2016 related to corresponding European Patent Application No. 16179159.
(Continued)

*Primary Examiner* — Kenneth Bomberg
*Assistant Examiner* — Adam W Brown
(74) *Attorney, Agent, or Firm* — Fishman Stewart PLLC

(57) ABSTRACT

A variable turbine and/or compressor geometry for an exhaust gas turbocharger may include an adjusting ring for simultaneously adjusting a plurality of guide vanes. The adjusting ring may be operatively connected to an articulated lever via a first contact surface and to an associated adjusting lever of the plurality of guide vanes via a second contact surface. The adjusting ring may include, at least in a region of the first contact surface, an additional component which is pressed into the adjusting ring and which increases the first contact surface operatively connected with the articulated lever.

16 Claims, 2 Drawing Sheets

(51) Int. Cl.
  *F02B 33/40* (2006.01)
  *F02B 37/24* (2006.01)
  *F04D 29/46* (2006.01)
(52) U.S. Cl.
  CPC ........ *F04D 29/462* (2013.01); *F05D 2220/40* (2013.01); *F05D 2240/12* (2013.01); *F05D 2240/50* (2013.01); *Y02T 10/144* (2013.01)
(58) Field of Classification Search
  CPC ............. F05D 2240/50; F05D 2240/12; F05D 2220/40
  See application file for complete search history.

(56) References Cited

U.S. PATENT DOCUMENTS

| | | | | |
|---|---|---|---|---|
| 8,104,280 | B2* | 1/2012 | Akita | B21C 23/001 29/889.7 |
| 8,668,444 | B2* | 3/2014 | Jarrett, Jr. | F01D 17/162 415/160 |
| 8,702,381 | B2* | 4/2014 | Alajbegovic | F01D 17/165 415/162 |
| 9,790,949 | B2* | 10/2017 | Tashiro | F02B 37/24 |
| 2003/0170116 | A1 | 9/2003 | Knauer et al. | |
| 2008/0107520 | A1* | 5/2008 | Battig | F01D 17/162 415/160 |
| 2014/0147254 | A1* | 5/2014 | Tashiro | F01D 17/165 415/146 |

FOREIGN PATENT DOCUMENTS

| | | |
|---|---|---|
| EP | 1120547 A2 | 8/2001 |
| GB | 2217790 A | 11/1989 |

OTHER PUBLICATIONS

Chinese Office Action dated Mar. 29, 2019 related to corresponding Chinese Patent Application No. 201610533469.0.

* cited by examiner

VARIABLE TURBINE OR COMPRESSOR GEOMETRY FOR AN EXHAUST GAS TURBOCHARGER

CROSS-REFERENCE TO RELATED APPLICATIONS

This application claims priority to German Patent Application No. 10 2015 213 321.4, filed Jul. 16, 2015, the contents of which are hereby incorporated by reference in its entirety.

TECHNICAL FIELD

The present invention relates to a variable turbine or compressor geometry for an exhaust gas turbocharger.

BACKGROUND

DE 102 62 006 B4 discloses a generic variable turbine or compressor geometry for an exhaust gas turbocharger comprising a vane bearing ring on which individual guide vanes are rotatably mounted. Additionally provided is an adjusting ring for simultaneously adjusting the individual guide vanes, the adjusting ring being in operative connection with adjusting levers of the guide vanes.

In general, adjusting rings for simultaneously adjusting individual guide vanes are used in the case of known variable turbine/compressor geometries. An adjustment by the adjusting ring occurs here via an actuator which engages in the adjusting ring via a kinematic mechanism using articulated levers and thus transmits the required adjusting forces. Wear occurs at a contact point between such an articulated lever and the adjusting ring on account of the relative movement occurring there. In order to keep this wear within limits, it is already known to provide both the articulated lever and the adjusting ring in the region of a contact zone with a wear protection layer. It is also known to design the articulated lever and/or the adjusting ring to be thicker and thus to reduce a surface pressure arising between the articulated lever and the adjusting ring, with the result that it is also intended to achieve low wear with large adjusting forces and long vehicle lifetimes.

However, a disadvantage of a thickened adjusting ring is its considerably increased material requirement and also the considerably increased weight.

SUMMARY

The present invention is therefore concerned with the problem of specifying an improved or at least an alternative embodiment for a variable turbine and/or compressor geometry of the generic type that is particularly capable of transmitting high adjusting forces over the long term and of nevertheless being designed in a weight-optimized manner.

This problem is solved according to the invention by the subject matter of the independent Claim(s). Advantageous embodiments form the subject matter of the dependent claims.

The present invention is based on the general idea of locally reinforcing an adjusting ring for simultaneously adjusting guide vanes of a variable turbine or compressor geometry in the region of a contact surface to an articulated lever and thereby of reducing the surface pressure between the adjusting ring and the articulated lever that occurs there. Here, the variable turbine or compressor geometry according to the invention has the stated adjusting ring which is in operative connection with the articulated lever via a first contact surface and with adjusting levers of the guide vanes via second contact surfaces. According to the invention, the adjusting ring then has, at least in the region of the first contact surface, an additional component which is pressed into the adjusting ring and which increases the first contact surface in operative connection with the articulated lever. By virtue of the additional component pressed in according to the invention, the increased contact surface can be fastened in a play-free manner on the adjusting ring without methods which require the input of heat, such as, for example, a welding method, being necessary for this purpose. The additional component arranged according to the invention at least in the region of the first contact surface makes it possible to have a locally limited increase in the first contact surface without having to design the adjusting ring to be thicker overall and thus heavier to achieve this. Overall, it is thus possible, by comparison with a completely thickened adjusting ring, for a considerable weight reduction and a considerable reduction in the material costs to be achieved. The pressing-in operation can create a connection, in particular a press fit connection, which requires no additional processing steps and can thus be implemented cost-effectively.

In a further advantageous embodiment of the solution according to the invention, the adjusting ring has, in the region of at least one second contact surface, an additional component which is pressed into the adjusting ring and which increases the second contact surface in operative connection with the associated adjusting lever. The additional component according to the invention can thus be arranged not only between the adjusting ring and the articulated lever but, purely theoretically, also between the adjusting ring and at least one adjusting lever of a guide vane, with the result that it is also possible here to achieve a larger contact surface and thus a reduced surface pressure and a lower degree of wear. In this region, too, the additional components can be pressed in, which constitutes a fastening method which is not only cost-effective but also avoids any input of heat. Particularly during a welding operation namely, a distortion of the adjusting ring can occur which compromises its functional capacity.

In an advantageous development of the solution according to the invention, at least one additional component takes the form of a metal-powder injection-moulded part. In metal injection moulding (MIM), a metal provided with a binder is processed in an injection-moulding process. The binder is then removed again, with the result that it is possible to produce complex shaped parts in relatively large numbers with simultaneously very low tolerances at low costs.

In a further advantageous embodiment of the solution according to the invention, at least one additional component has bulges or bulge-like elevations, such as, for example, ridges, which allow play-free pressing into the adjusting ring. Such bulges make possible in particular a press fit connection between the additional component and the adjusting ring without subsequent processing, since these comparatively small bulges can be pressed over during the pressing in operation and thus ensure a play-free fit.

It is expedient for at least one additional component to be nitrided and thereby surface-finished. Nitriding is also technically referred to as nitrogen case hardening and constitutes a process of hardening steel. Nitriding particularly involves feeding in nitrogen which positively influences the surface hardness.

In a further advantageous embodiment of the solution according to the invention, at least one U-shaped recess, in which the at least one additional component positively engages, is provided on the adjusting ring. Provision can additionally be made for the additional component to engage around an edge of the U-shaped recess. The positive connection between the additional component and the recess on the adjusting ring can ensure particularly reliable and play-free fixing of the additional component on the adjusting ring, particularly also over the long term.

Further important features and advantages of the invention will emerge from the subclaims, from the drawings and from the associated description of the figures on the basis of the drawings.

It will be understood that the features stated above and those yet to be explained below can be used not only in the combination specified in each case but also in other combinations or in isolation without departing from the scope of the present invention.

BRIEF DESCRIPTION OF THE DRAWINGS

Preferred exemplary embodiments of the invention are illustrated in the drawings and will be explained in more detail in the description which follows, wherein identical reference signs refer to identical or similar or functionally identical components.

Thus, in each case diagrammatically.

DETAILED DESCRIPTION

Figure 1:
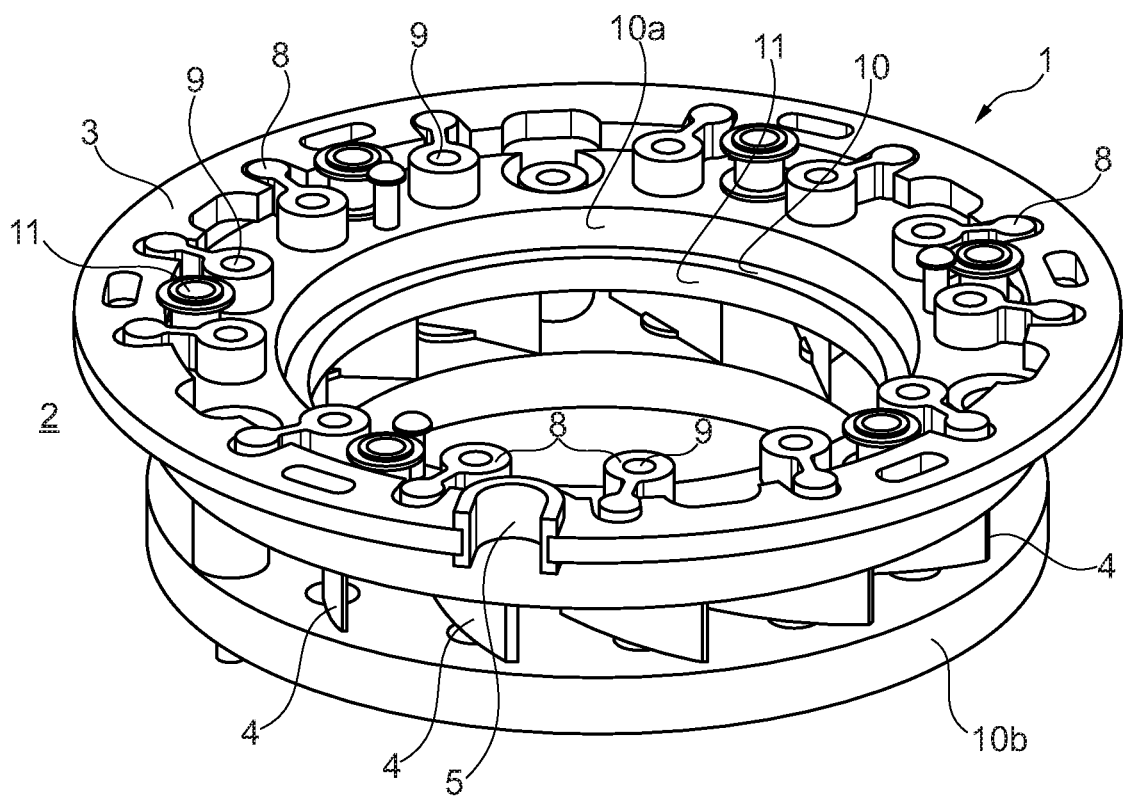
FIG. 1 shows a variable turbine or compressor geometry according to the invention for an exhaust gas turbocharger.
Figure 2:
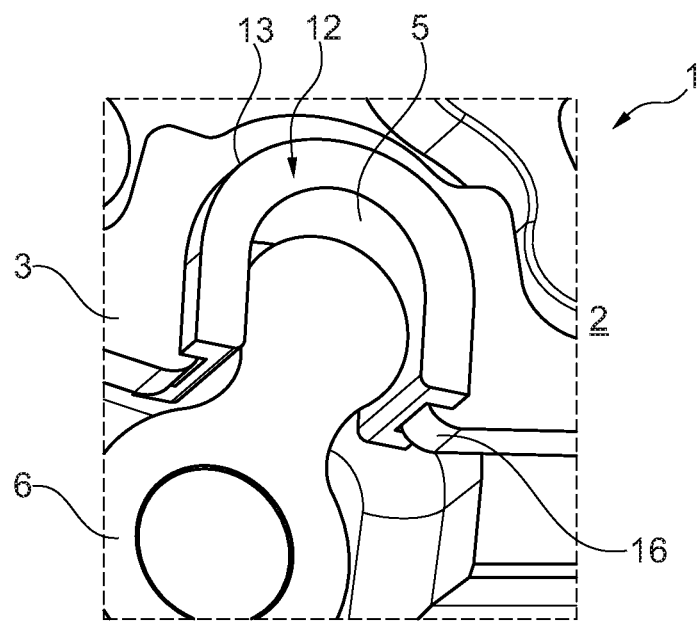
FIG. 2 shows a detail illustration from FIG. 1 in the region of a first contact surface.
Figure 3:
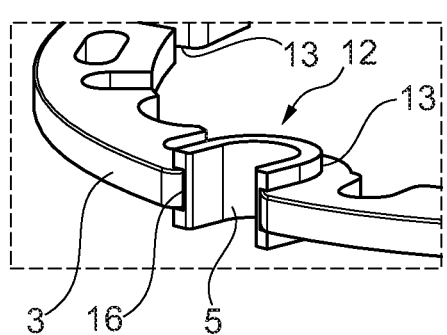
FIG. 3 shows a view of the first contact surface of the adjusting ring, with the adjusting ring extracted.
Figure 4:
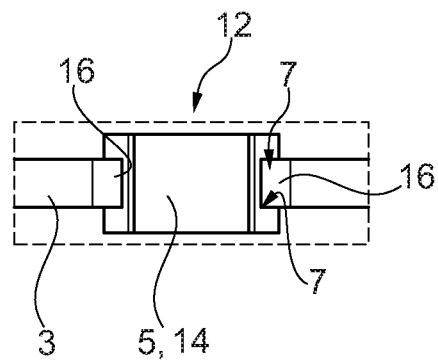
FIG. 4 shows a view of an additional component in the region of a first or second contact surface.

According to FIG. 1, a variable turbine or compressor geometry 1 for an exhaust gas turbocharger 2 has an adjusting ring 3 for simultaneously adjusting guide vanes 4, wherein the adjusting ring 3 is in operative connection with an articulated lever 6 via a first contact surface 5 (cf. in particular also FIGS. 2-6) and with adjusting levers 8 of the guide vanes 4 via second contact surfaces 14. Here, the guide vanes 4 are rotatably mounted in a vane bearing ring 10 via their vane bearing pins 9. Of course, it is also possible for the guide vanes 4 to be rotatably mounted via their vane bearing pins 9 in a vane bearing ring 10 comprising two vane bearing rings 10a, 10b, or in, in general, two vane bearing rings 10a, 10b. The adjusting ring 3 can be guided on the vane bearing ring 10 via rollers 11, for example. In an analogous manner, it is of course also possible for the adjusting ring 3 to be mounted via a sliding bearing on the vane bearing ring 10.

In order thus to be able to reduce wear, in particular between the articulated lever 6, which is connected to an adjusting device (not shown), and the adjusting ring 3, the adjusting ring 3 has, at least in the region of the first contact surface 5, an additional component 12 which is pressed into the adjusting ring 3 and which increases the first contact surface 5 in operative connection with the articulated lever 6. The additional component 12 can additionally be adhesively bonded to the adjusting ring 3 in this region. By pressing the additional component 12 into a U-shaped recess 13 provided for this purpose on the adjusting ring 3, the additional component 12 can be joined, free of subsequent processing, to the adjusting ring 3, this joining moreover being free of any heat input which would occur, for example, if the additional component 12 were welded to the adjusting ring 3.

Figure 5:
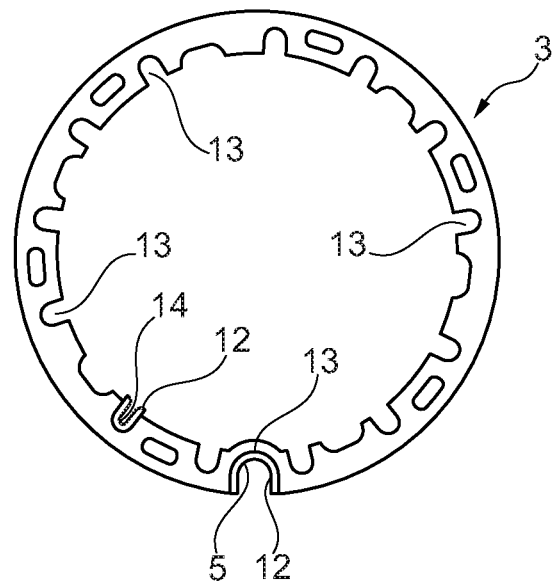
FIG. 5 shows an adjusting ring according to the invention.
Figure 6:
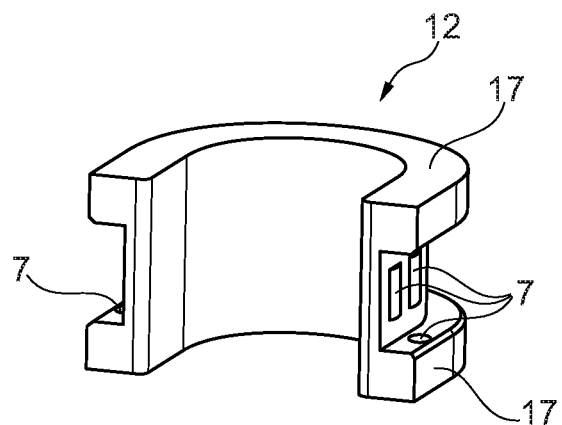
FIG. 6 shows a detail view of an additional component according to the invention.

In addition, the adjusting ring 3 can have, in the region of at least one second contact surface 14, likewise an additional component 12 which is likewise pressed into the adjusting ring 3 and which increases the second contact surface 14 in operative connection with the associated adjusting lever 8 (cf. in particular FIG. 5). The additional component 12 can also be adhesively bonded to the adjusting ring 3 in this region. As a result, it is also possible to reduce the adjusting forces which occur between the adjusting levers 8 and the adjusting ring 3 when adjusting the guide vanes 4, and thus the surface pressure which occurs, with the result that wear can be minimized and the service life can be increased.

At least one of these additional components 12 can be produced, for example, as a metal-powder injection-moulded part (MIM) and thus be manufactured in large numbers in a highly precise manner and cost-effectively at the same time.

In order to be able to ensure play-free pressing of the additional component 12 into the associated U-shaped recess 13 on the adjusting ring 3, it is possible to provide on the additional component 12 bulges 7 or bulge-like elevations, such as, for example, ridges, (cf. FIG. 6) which are pressed over during the pressing-in operation. Here, the bulges 7 or ridge-like elevations can of course also be arranged on a curved surface in contact with the U-shaped recess 13. Moreover, the additional component 12 can be designed in such a way that it engages around an edge 16 of the U-shaped recesses 13, in particular being designed to be C-shaped in cross section and thus being able to be fixed particularly precisely and reliably on the adjusting ring 3. In this case, the bulges 7 can be arranged, for example, on a region 17 engaging around the edge 16 of the adjusting ring 3 (cf. FIG. 6).

In order to be able to additionally increase the service life of the adjusting ring 3 according to the invention and thus also that of a variable turbine or compressor geometry 1 equipped therewith, provision can be made for the additional component 12 and/or the adjusting ring to be nitrided and thereby surface-finished.

According to FIG. 5, only one additional component 12 is arranged in the region of the second contact surface 14, it of course also being possible to make provision that also all the other recesses 13 are lined with such additional components 12.

The variable turbine or compressor geometry 1 according to the invention thus makes it possible to be able to reliably transmit in particular high adjusting forces for adjusting the guide vanes 4 with low wear and thus preferably over the entire service life of the exhaust gas turbocharger 2.

The invention claimed is:

1. A variable turbine and/or compressor geometry for an exhaust gas turbocharger, comprising:
   an adjusting ring for simultaneously adjusting a plurality of guide vanes, wherein the adjusting ring is in operative connection with an articulated lever via a first contact surface and with an associated adjusting lever of the plurality of guide vanes via a second contact surface;
   wherein the adjusting ring includes, at least in a region of the first contact surface, an additional component which is pressed into the adjusting ring and which increases the first contact surface in operative connection with the articulated lever; and wherein a rotation axis of the adjusting ring is parallel to a rotation axis of the articulated lever in operative connection with the first contact surface.

2. The variable turbine and/or compressor geometry according to claim 1, wherein the adjusting ring further includes, in a region of the second contact surface, another additional component which is pressed into the adjusting ring and which increases the second contact surface in operative connection with the associated adjusting lever.

3. The variable turbine and/or compressor geometry according to claim 1, wherein the additional component is configured as a metal-powder injection-moulded part.

4. The variable turbine and/or compressor geometry according to claim 1, wherein the additional component includes at least one bulge engaged with the adjusting ring that facilitates a play-free press fit of the additional component with the adjusting ring.

5. The variable turbine and/or compressor geometry according to claim 1, wherein the additional component has a nitrided surface-finish.

6. The variable turbine and/or compressor geometry according to claim 1, wherein the adjusting ring further includes at least one U-shaped recess, and wherein the additional component positively engages into the at least one U-shaped recess.

7. The variable turbine and/or compressor geometry according to claim 6, wherein the additional component is configured to engage around an edge of the at least one U-shaped recess.

8. The variable turbine and/or compressor geometry according to claim 1, wherein the additional component is adhesively bonded to the adjusting ring.

9. The variable turbine and/or compressor geometry according to claim 1, wherein the adjusting ring has a U-shaped recess and the additional component positively engages into the U-shaped recess and is secured to the adjusting ring via a press-fit connection.

10. The variable turbine and/or compressor geometry according to claim 9, wherein the additional component has a curved surface that is recessed between two protruding regions, and wherein the curved surface is in contact with the U-shaped recess and the two protruding regions engage around an edge of the U-shaped recess.

11. An exhaust gas turbocharger, comprising: a variable turbine and/or compressor geometry, the variable turbine and/or compressor geometry including:

an adjusting ring for simultaneously adjusting a plurality of guide vanes, the adjusting ring having a first contact surface operatively connected to an articulated lever and a second contact surface operatively connected to an associated adjusting lever of the plurality of guide vanes;

wherein the adjusting ring includes an additional component disposed in a region of the first contact surface, and wherein the additional component is pressed into the adjusting ring and increases a surface area of the first contact surface; and wherein a rotation axis of the adjusting ring is parallel to a rotation axis of the articulated lever in operative connection with the first contact surface.

12. The exhaust gas turbocharger according to claim 11, wherein the adjusting ring further includes at least one other additional component disposed in a region of the second contact surface, the at least one other additional component being pressed into the adjusting ring and structured to increase a surface area of the second contact surface, and wherein the at least one other additional component is configured as a metal-powder injection-moulded part.

13. The exhaust gas turbocharger according to claim 12, wherein the metal-powder injection-moulded part has a surface that is nitrided.

14. The exhaust gas turbocharger according to claim 12, wherein the at least one other additional component includes a plurality of bulges that facilitate a play-free press-fit connection with the adjusting ring.

15. The exhaust gas turbocharger according to claim 11, wherein the adjusting ring has a U-shaped recess that receives the additional component, and wherein the additional component includes at least one bulge disposed on a curved surface of the additional component in contact with the U-shaped recess to facilitate a play-free press-fit connection with the adjusting ring.

16. The exhaust gas turbocharger according to claim 11, wherein the adjusting ring further includes a U-shaped recess including at least one edge, wherein the additional component has a C-shaped cross-section relative to a central axis of the adjusting ring, and wherein the additional component positively engages into the U-shaped recess and engages around the at least one edge.

* * * * *